United States Patent

Busdiecker et al.

[15] 3,661,546
[45] May 9, 1972

[54] MIRROR BLANK CORE AND METHOD OF MAKING

[72] Inventors: Robert A. Busdiecker, Woodville; James E. Rapp, Oregon; Clarence L. Babcock, Toledo, all of Ohio

[73] Assignee: Owens-Illinois, Inc.

[22] Filed: May 21, 1970

[21] Appl. No.: 39,520

Related U.S. Application Data

[63] Continuation of Ser. No. 518,446, Jan. 3, 1966, abandoned.

[52] U.S. Cl. ...................................... 65/33, 65/36, 65/37, 65/58, 156/89, 161/162
[51] Int. Cl. ................. C03b 29/00, C03b 11/08, G02b 5/08
[58] Field of Search .................. 161/162; 65/33, 37, 36, 58; 156/89

[56] References Cited

UNITED STATES PATENTS

| | | | |
|---|---|---|---|
| 2,086,185 | 8/1936 | Keaney | 65/58 |
| 3,246,972 | 4/1966 | Smith | 65/33 |
| 3,346,357 | 10/1967 | Baak | 65/33 |
| 1,888,341 | 11/1932 | Winckler | 65/37 |

*Primary Examiner*—Frank W. Miga
*Attorney*—Beveridge and De Grandi

[57] ABSTRACT

Unitary, rigid telescope mirror blanks are disclosed formed from a plurality of polyhedrons. The polyhedrons may be glass or crystallized glass and are assembled so that adjacent facing complimentary and parallel contacting surfaces are directly sealed to each other and none of the contacting surfaces are perpendicular to the horizontal when the mirror blank is in a substantially horizontal position. Methods of sealing and crystallizing are disclosed.

14 Claims, 17 Drawing Figures

MIRROR BLANK CORE AND METHOD OF MAKING

REFERENCE TO RELATED APPLICATION

This application is a continuation of copending application Ser. No. 518,446, filed Jan. 3, 1966, now abandoned, which is relied on.

This invention relates to articles of substantial thickness made from a glass, such as a thermally crystallizable glass, and to a method for making such articles. More particularly, the present invention relates to astronomical mirror blanks and to a method for making lightweight astronomical mirror blanks from a glass, such as a thermally crystallizable glass.

In a further aspect, the present invention relates to lightweight, transparent, crystallized glass astronomical mirror blanks which are particularly valuable because of their relatively low coefficients of thermal expansion.

Special problems of a difficult nature are encountered in the manufacture of telescope mirror blanks of relatively large diameters and thicknesses. Since the condition and the configuration of the reflecting face surface of the finished mirror determines the accuracy of the reflected image and because the mirror must be of sufficient rigidity so as to prevent even the slightest movement or distortion of the reflecting mirror surface, the thickness of the mirror must be substantial in order to ensure sufficient strength and rigidity. Increasing thickness brings added weight which further complicates the already complex problems involved in supporting large mirrors.

Since the ratio of the diameter of the mirror blank to the thickness thereof is approximately 6 to 1, it is readily evident that a mirror blank of one, two, four or even six hundred inches in diameter comprises a large amount of glass in terms of size and weight. Casting such a mirror blank of fused silica, borosilicate glass or other known glass materials involves a long, tedious process. The problems encountered with respect to cooling and annealing the glass to ensure uniform expansion characteristics being imparted to all portions thereof are staggering. Of course, any variation in the expansion characteristics of one area of the glass with respect to another area will adversely affect the reflecting surface and the quality of the image being observed therefrom. It is important that the coefficient of thermal expansion be as low as possible and, ideally, be zero, so that little or no expansion occurs when the mirror is exposed to varying temperatures during use of the telescope.

Attempts have been made in the past to decrease and lessen the overall weight of such telescope mirrors by forming a mirror blank of a minimum thickness and then subsequently bonding the under surfaces of the mirror blank to glass members of the same composition, which glass members as a whole impart a certain rigidity to the ultimate reflecting mirror. One example of this is the use of so-called "egg crate" construction wherein a plurality of elongated glass strips having spaced slotted portions along one longitudinally extending edge are interconnected with a plurality of similar glass strips extending at right angles thereto, the connection being at the respective slotted portions so that the final structure is of the same thickness or height as the individual strip, just as is the case of the interconnected cardboard members used with an egg crate to separate the individual eggs.

However, due to the overall size of the glass strips and the thicknesses of the mirror blank, considerable problems occur when the glass strips are subjected to temperatures sufficient to fuse them together along adjoining portions and also fuse the upper surface of the interlocked egg crate structure to the bottom surface of the mirror blank. A glass backup plate of sufficient thickness to impart rigidity to the mirror must also be fused to the other surface of the egg crate structure. Since the formation or construction of mirrors is a very delicate operation and the temperature to which the glass is subjected as it is being cooled has to be very carefully controlled, it will be apparent that difficulties are encountered as soon as an attempt is made to fuse the egg crate glass structure to the bottom surface of the glass mirror blank and to the backup plate. To do this successfully is a tedious, time-consuming operation which adds considerably to the cost of the final product.

Additional problems are incurred in the positioning and mounting of these mirrors in the telescopes. Because of the effect of any strain on the shape of the reflecting surface, complex mounting means must be utilized for supporting the mirror in the telescope. In these cases, extreme precautions must be taken to insure that the mirror is properly supported and positioned in a strain-free condition which must be independent and irrespective of the position of the telescope as it is moved to observe different areas of the sky.

Accordingly, it is an object of the present invention to provide an astronomical mirror blank which overcomes these shortcomings and disadvantages which exist in the prior art.

It is a further object of the present invention to provide a method of making an astronomical mirror blank which method avoids the disadvantages which exist in methods used heretofore.

It is another object of the present invention to provide a method of forming a lightweight, low expansion, vitreous telescope mirror blank.

Another object of the present invention is to provide a lightweight, transparent, thermally crystallized glass-ceramic telescope mirror blank having a low lineal coefficient of thermal expansion.

A further object is to provide for a low-expansion, thermally crystallized glass telescope mirror.

Still another object of the present invention is to provide other articles which are made from a glass, including from a thermally crystallizable glass.

A further object of the present invention is to provide a method for forming other articles from a glass, including from a thermally crystallizable glass.

In attaining the foregoing objects, one feature of the present invention resides in a method of making an astronomical mirror blank having a pair of oppositely disposed surfaces wherein a plurality of polyhedrons are positioned with respect to each other between such surfaces in such a manner that no contacting surface of any polyhedron is in a plane which is parallel to the longitudinal axis of the mirror blank; i.e., when the mirror blank is in a horizontal position, a plane surface of any polyhedron, that is in contact with any other surface of a component of the mirror blank, is never perpendicular to the horizontal. This arrangement provides for the application of pressure on each sealing surface of the polyhedrons due to the force of gravity and such pressure is maintained throughout the treatment steps, resulting in the unitary telescope mirror blank of the invention.

Another feature of the invention resides in having the polyhedrons formed of a thermally crystallizable glass composition and subjecting the prearranged configuration of polyhedrons to temperatures sufficient to bond together adjoining surfaces, to nucleate the composition and subsequently to crystallize the composition to form a unitary, thermally crystallized mirror blank.

Still another feature of the present invention resides in providing some or all of the polyhedrons with cavities which communicate with the outer surface through openings smaller in cross-sectional areas than the cross-sectional areas of the cavities, and wherein the hollow polyhedrons are so arranged that passageways are provided for the free access or egress of fluids to or from each cavity to the outside of the mirror blank.

Other objects, features and advantages of the present invention will become apparent from the following detailed description thereof taken in conjunction with the drawings wherein:

Figure 1:
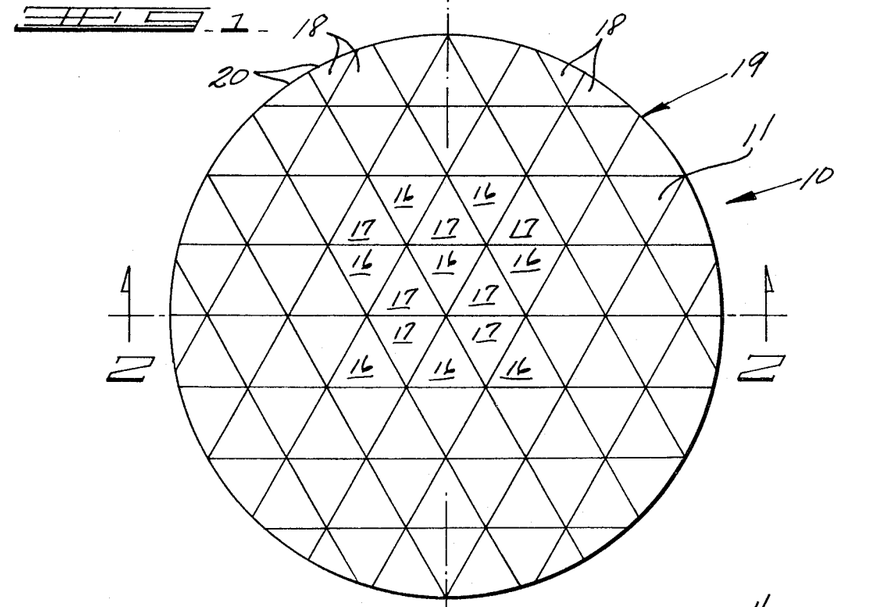
FIG. 1 is a plan view of one embodiment of the telescope mirror blank of the present invention showing the arrangement of a plurality of polyhedrons which are bonded together.
Figure 2:
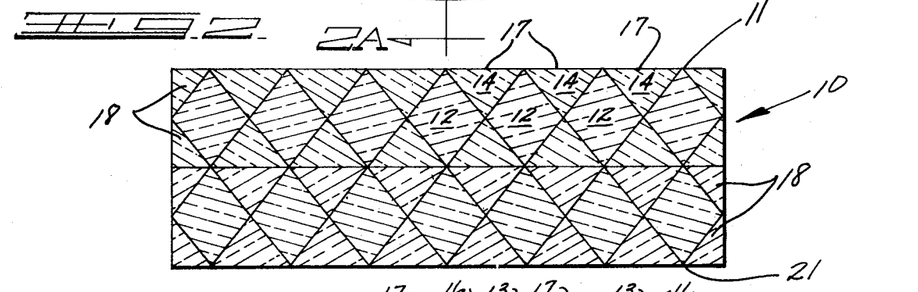
FIG. 2 is a sectional view of the mirror blank of the invention taken along lines 2—2 of FIG. 1.
Figure 2A:
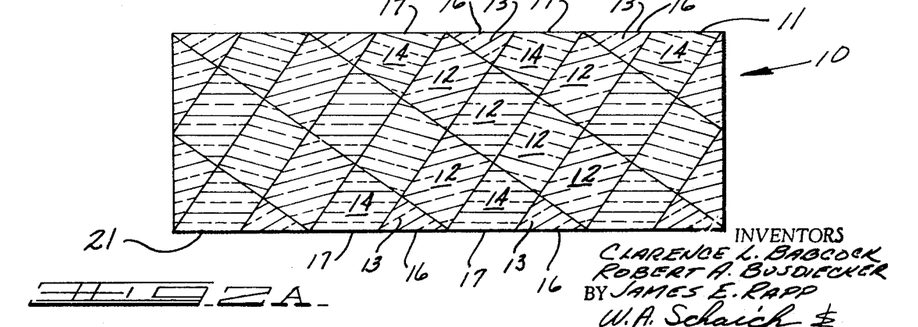
FIG. 2a is a sectional view of the mirror blank of the invention taken along lines 2a—2a of FIG. 1.
Figure 5:
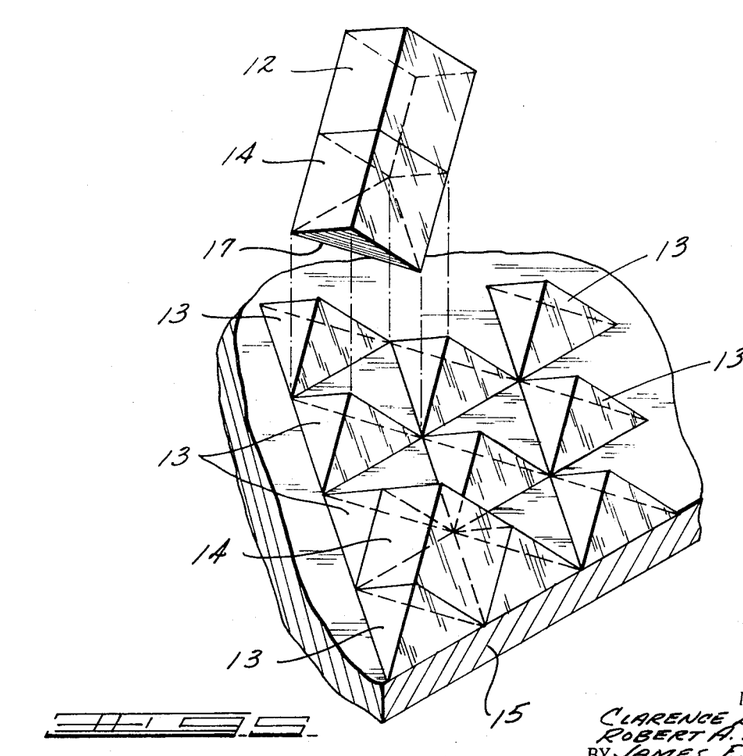
FIG. 5 is an exploded view of a portion of the mirror blank of FIG. 1 showing a specific arrangement of the polyhedrons of FIGS. 3 and 4 which form the mirror blank.

In accordance with the present invention, an astronomical mirror blank having a pair of oppositely disposed surfaces is formed from a plurality of polyhedrons made of a thermally crystallizable glass composition. As shown in FIGS. 1, 2 and 5, one embodiment of the telescope mirror blank 10 of the present invention is formed from a plurality of polyhedrons which are arranged in such a manner as to form a top or face surface layer 11 which may be subsequently ground, polished and figured to form the reflecting surface.

Figure 3:
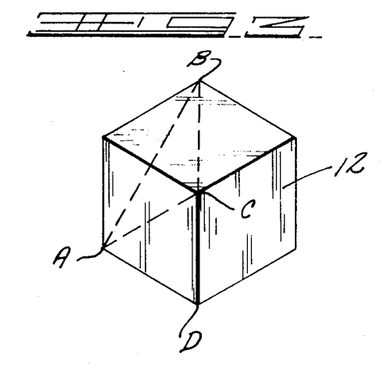
FIG. 3 is an isometric view of a hexahedron, specifically a cube, which is utilized in making the mirror blank illustrated in FIG. 1.

The principal polyhedron structures utilized are the hexahedron or cube 12, the tetrahedron 13 which is formed by cutting cube 12 along the lines A–B, B–C and A–C, as shown in FIG. 3, and the remaining structure 14 of the cube 12. By arranging these three basic polyhedrons in the manner illustrated in FIG. 5, within a jig or holding member 15 which is of the size and shape of the desired mirror blank, the assembled polyhedrons form the mirror illustrated in FIG. 1. The reflecting surface 11 comprises a plurality of triangular faces 16, 17 of polyhedrons 13, 14, respectively. The polyhedrons 18 which are located about the outer periphery 19 of the surface 11 and the sides of the mirror blank are merely variations of polyhedrons 13 and 14. The outermost edges 20 of faces 16, 17 have been previously shaped to impart an annular configuration to the mirror blank. Knowing in advance the size of the mirror blank to be constructed and the size of the cube 12 and its corresponding polyhedrons 13 and 14, one can readily ascertain the size and configuration of the polyhedrons 18 which are to be located at the edges and sides of the blank. Polyhedrons 18 of the proper size and configuration can readily be made and inserted into the corresponding openings within the jig or mold 15 to form the desired mirror blank.

An important concept of the present invention is in utilizing a plurality of polyhedrons to make a mirror blank wherein none of the contacting surfaces of the polyhedrons is in a plane parallel to the longitudinal axis of the mirror blank, i.e., when the mirror blank is in the horizontal position, as shown in FIG. 2, none of the contacting polyhedron surfaces is perpendicular to the horizontal. When using hexahedrons, such as the cubes shown in FIG. 3, it is preferred that they be arranged so that one of the internal axes extending from a corner of the cube to the furthest opposite corner, such as along line B–D of FIG. 3, is parallel to the longitudinal axis of the mirror, i.e., perpendicular to the horizontal when the mirror blank is in a horizontal position.

As illustrated in FIG. 5, cubes 12, tetrahedrons 13, and polyhedrons 14 are arranged within a support or jig 15 (only partly shown), in such a manner that the assembled mirror blank has a flat surface 21 formed adjacent the bottom of the mold and also has a flat surface 11 formed as its upper surface. The flat surfaces 11, 21 are formed by the triangular surfaces 16, 17 of polyhedrons 13 and 14, respectively.

Figure 6:
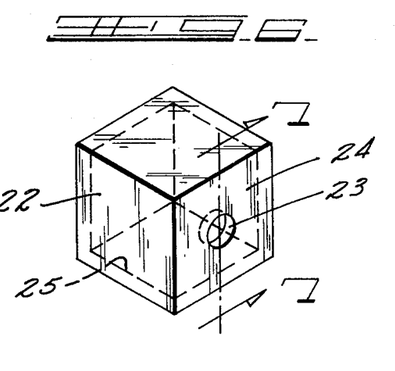
FIG. 6 is an isometric view of a hollow hexahedron suitable for purposes of the invention and having an opening therethrough communicating with a cavity formed therein.
Figure 7:
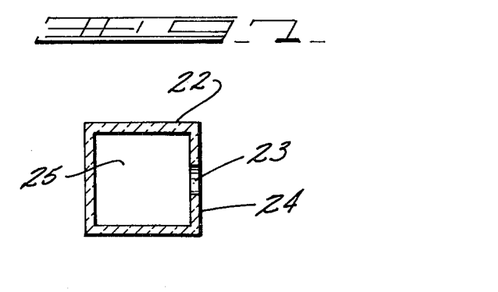
FIG. 7 is a sectional view taken along lines 7—7 of the hexahedron illustrated in FIG. 6.
Figures 8, 9:
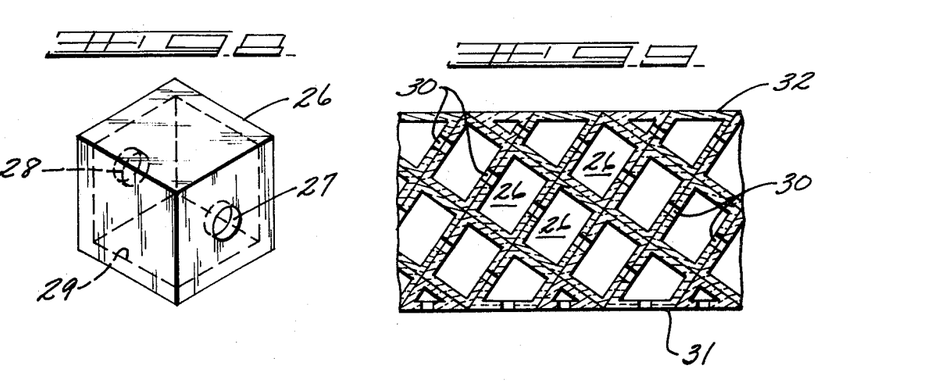
FIG. 8 is an isometric view of a hollow hexahedron having a pair of openings therethrough communicating with a cavity formed therein.
FIG. 9 is a sectional view similar to FIG. 2 but another embodiment of a telescope mirror blank of the invention formed by a plurality of polyhedrons, including the hexahedron illustrated in FIG. 8, arranged in a manner to define passageways communicating from the cavities to the outside of the mirror blank.

While the mirror blank can be formed from a plurality of hollow cubes 22 (FIG. 6) provided with an opening 23 through one surface 24, the cross-sectional area of the opening 23 being less than the cross-sectional area of the cavity 25, and such mirror blank is of considerably less weight than the mirror blank formed of solid polyhedrons, it is more desirable to form the mirror blank of hollow cubes 26 having a pair of oppositely disposed openings 27, 28 communicating with cavity 29. By use of such cubes and by also having the tetrahedron 13 and polyhedron 14 of hollow structure and provided with a pair of openings, it is possible to have the structure of the mirror blank such that continuous channels 30 are formed therein by aligned openings in contacting surfaces, connecting the cavities of a plurality of polyhedrons with the outer, lower surface 31 of the mirror blank, as shown in FIG. 9.

While in one embodiment of the present invention it is desirous of having the upper surface 11 of the mirror blank 10 become the reflecting surface of the telescope mirror formed thereof and thus it is essential that the surface be solid, it is also contemplated that the arrangements of polyhedrons in accordance with the invention may be utilized with a separate layer or plate of glass adhering to the upper surface 11 of the mirror blank. As will be understood, the polyhedrons 13 and 14 at the upper surface of the mirror blank can be solid, or hollow, or can be hollow with at least one opening communicating with one of the openings in the adjacent polyhedron disposed therebelow.

Figure 4:
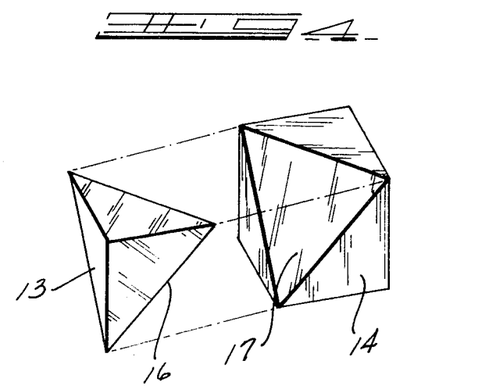
FIG. 4 is an exploded view of the hexahedron of FIG. 3 and shows two additional configurations of polyhedrons which, together with the cube of FIG. 3, make up the basic structure of the mirror blank of FIG. 1.
Figure 10:
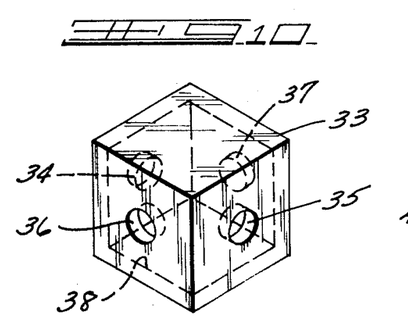
FIG. 10 is an isometric view of a hollow hexahedron having two pairs of openings therethrough communicating with a cavity formed therein.

When utilizing a cube 33 of the construction illustrated in FIG. 10 having a pair of oppositely disposed openings 34, 35 and 36, 37 communicating with cavity 38, the resulting mirror blank (FIG. 11) will have a plurality of channels 39, 40 extending at right angles to each other. Again, the polyhedrons forming the lower surface of the blank and having the configuration shown in FIG. 4, are hollow and provided with the necessary openings to permit channels 39, 40 to communicate with the outside of the mirror blank. If it is desired to have channels communicating only with the sides of the mirror blank, as, for example, if a backup plate of the same composition were to be adhered to the bottom surface of the blank, appropriate openings can be formed in the polyhedrons to form such channels. To form channels which communicate with the sides and bottom of the mirror blank, a polyhedron 41 having three pairs of oppositely disposed openings communicating with a cavity 42, can be utilized.

Figures 12, 13:
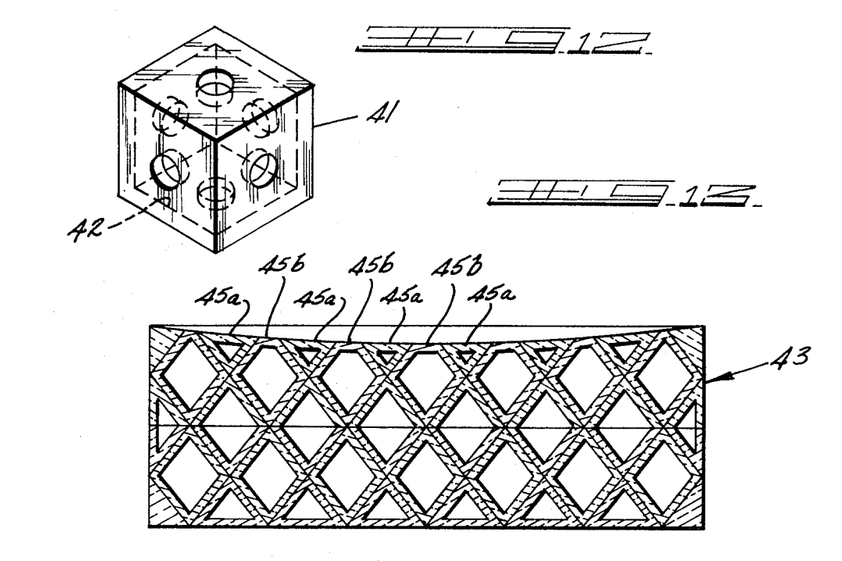
FIG. 12 is an isometric view of a hollow hexahedron having three pairs of openings therethrough communicating with a cavity formed therein.
FIG. 13 is a sectional view of still another embodiment of the mirror blank of the invention wherein the reflecting surface is concave.

In still another embodiment, shown in FIG. 13, a mirror blank 43 having the necessary arrangement of polyhedrons as discussed above and, in addition, having a concave upper surface 44, can readily be formed. Again, knowing the diameter and size of the mirror blank, and the curvature of the concave upper surface, the polyhedrons 45a and 45b, which form the upper surface, can be formed to the exact specifications so that the uppermost surface of each polyhedron has the necessary configuration, resulting in the mirror blank of FIG. 13, ready for figuring to the precise desired configuration. Again, some or all of the polyhedrons which are arranged to form the mirror blank can be hollow and, if hollow, can be provided with openings which form channels communicating with the outside atmosphere, in the manner discussed supra with respect to other embodiments. In this embodiment, also, a separate, curved plate can be sealed to the curved surface to provide a continuous mirror surface. Since the plate becomes the mirror-forming surface, it will be understood that in this and other embodiments of the invention, some of the odd-shaped pieces forming the top surface of the polyhedron structure (such as parts 45a in FIG. 13) can be omitted, and sealing of the plate is effected on the remaining surface, such as at 45b.

Figure 16:
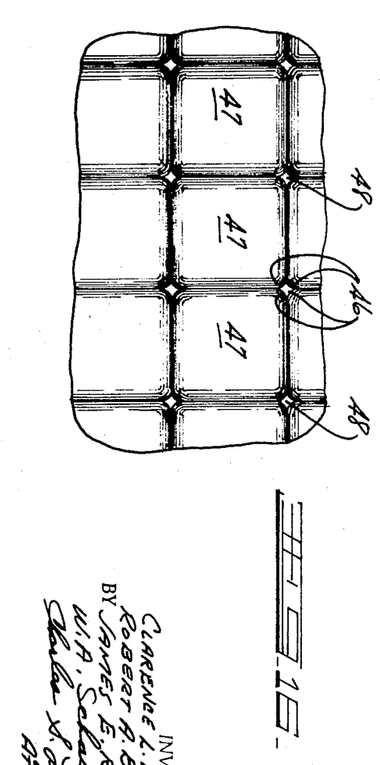
FIG. 16 is a sectional view of a portion of a mirror blank comprising polyhedrons including those of FIG. 15, taken along a plane which is parallel to two oppositely disposed surfaces of the polyhedrons of FIG. 15 and illustrating the channels defined by the edges of a set of four adjacent polyhedrons.

By rounding some or all of the edges 46 of a polyhedron, such as cube 47, whether it be solid or hollow, a channel 48 is formed along the adjacent rounded edges of at least two adjoining polyhedrons, or, as illustrated in FIG. 16, along the adjoining rounded edges of every four polyhedrons. Furthermore, by rounding the edges of the polyhedrons, the forming of the polyhedrons and the assembling of the plurality of polyhedrons to form the unitary mirror blank are greatly facilitated.

Figure 14:
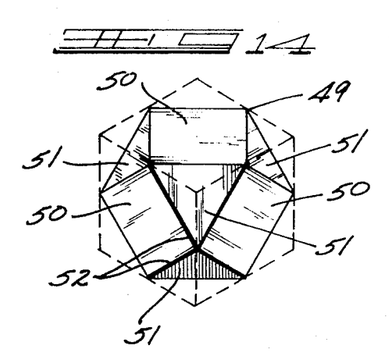
FIG. 14 is an isometric view of a 14-sided polyhedron which may be used in making a mirror blank in accordance with another embodiment of the invention.
Figure 15:
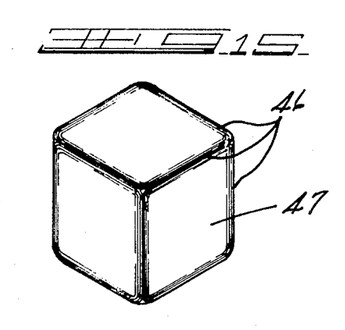
FIG. 15 is an isometric view of still another form of polyhedron which may be used in making a mirror blank in accordance with another embodiment of the invention, wherein the edges of the polyhedron are rounded.

While up to now the invention has been discussed in terms of polyhedrons, such as cubes and portions of cubes, i.e., tetrahedron 13 and polyhedron 14, it is to be understood that many other polyhedrons can be used in making the mirror blank of the invention. Examples of various polyhedrons include tetrahedrons, hexahedrons, octahedrons, dodecahedrons, icosahedrons, pyramids, and many others, as well as combinations of such shapes. Moreover, the polyhedrons need not necessarily be regular polyhedrons. It is to be noted, however, that the individual polyhedrons are assembled in such a manner that no contacting surface is perpendicular to the horizontally disposed mirror blanks so that pressure is applied to all contacting surfaces of each member, due to gravity. Further, it is not necessary that each of the outer surfaces of the polyhedron be in contact with or sealed to another surface. It is possible to utilize the present invention by forming a mirror blank of a plurality of polyhedrons, such as the 14-sided structure 49 formed by cutting of the eight corners of a cube. Adjoining structures would be secured by bonding between adjacent square faces 50 which are the original surfaces of the cube. It will be appreciated that when four polyhedrons 49 are in adjacent relationship in one layer with at least two surfaces of one polyhedron bonded to two adjacent surfaces of two other polyhedrons, the space defined by the triangular faces 51 is of pyramid shape. Thus, when a layer of four additional polyhedrons 49 is superimposed upon the first layer of four polyhedrons, the space defined by the triangular faces of the eight polyhedrons at what would ordinarily be the common point of contact of the polyhedrons is, in fact, of the shape of two pyramids placed base-to-base. Thus, lightweighting of a mirror can be accomplished using a plurality of polyhedrons 49 in view of the plurality of pyramid-shaped cavities which would be formed therein. If the edges 52 along the periphery of each square face 50 are chamfered, then the pyramid-shaped spaces communicate with the exterior of the blank, due to the plurality of channels which are formed and which communicate with the cavities. To make the mirror of even lighter weight, each polyhedron can be hollow and also can be provided with at least one pair of openings on oppositely disposed triangular faces 51 so as to form channels or passageways connecting the pyramid-shaped cavities to the polyhedron cavities and eventually to the outer surface of the mirror blank. The important factor, however, is to insure that the faces of the polyhedron are in a plane which is not perpendicular to the horizontally disposed mirror. This results in a force being applied to all surfaces of the polyhedrons in the mirror blank, which force greatly facilitates sealing during the heat treatment steps to which the mirror is subsequently subjected.

In preparing the telescope mirror blank such as shown in FIG. 1, any suitable jig or support can be used. The individual polyhedrons are arranged by placing a plurality of the polyhedrons in the jig in the manner shown in FIG. 5, with the surfaces of each polyhedron in contact with a surface of an adjacent unit. Thereafter, the assembly is subjected to a temperature for an adequate period of time sufficient to seal the contacting surfaces of the individual polyhedrons together.

The individual polyhedrons utilized in the present invention can be prepared in any number of ways. The polyhedrons having a cavity formed therein can be prepared, for example, by the methods that are shown in the copending application of Austin et al., Ser. No. 468,691, filed July 1, 1965 now U.S. Pat. No. 3,484,328, and assigned to the assignee of the present application, as well as the method for making hollow glass articles as taught in the application of Keefer, Ser. No. 503,831, filed Oct. 23, 1965 now U.S. Pat. No. 3,520,668, and assigned to the assignee of the present application, the entire disclosures of both of the aforementioned applications being incorporated herein by reference. The polyhedrons having cavities therein, such as shown in FIGS. 6, 8, 10 and 12, can also be made by known blow molding techniques. Solid shapes can be formed by conventional glass-forming techniques such as pressing or casting. Solid polyhedrons of fused silica can be formed according to conventional prior art methods.

The thickness of the walls of the hollow polyhedrons will vary with the size of the polyhedron and with the diameter and thickness of the mirror being formed, but the thickness must always be that which is sufficient to maintain the resulting mirror blank and reflecting telescope mirror made therefrom rigid under operating conditions when viewing astronomical bodies and the like. The size of each polyhedron will depend in part upon the ultimate size of the mirror blank. While polyhedrons having a length of up to 3 to 6 inches per side will be satisfactory, polyhedrons having lengths of up to 12 to 15 inches or even more will be utilized to form the larger telescope mirror blanks.

In making the mirror blanks, a multitude or plurality (i.e., at least 10 and usually many more) of polyhedrons are positioned in the manner described above so that pressure is exerted between all contacting surfaces that are to be sealed, due to the weight of the polyhedrons. The pressure between contacting surfaces assists in bonding during the sealing step. The assembly is thereafter heated for a time and temperature necessary to effect bonding, aided by the gravity effect.

In an important embodiment of the invention, the polyhedrons are formed of a thermally crystallizable glass composition. It is preferred that the glass members, after forming, be cooled by relatively rapid cooling rather than subjecting the glass members to a protracted annealing operation. A useful procedure is to air quench the glass members to minimize nuclei formation.

Prior to assembly, the polyhedrons and the glass parts can have their surfaces ground and polished flat for a better fit of contacting surfaces. A very serious problem, namely, surface crystallization, can occur during the sealing or fusing step. The surface crystallization is promoted on ground and polished, sawed or otherwise uncleaned glass surfaces and the glass crystallization on the surface is very rapid at sealing temperatures and can prevent good bonding of the parts. However, surface crystallization can be retarded by acid washing or by ion exchange (replacing $Li^+$ ions with $Na^+$ or $K^+$ ions). After the polyhedrons have been assembled in the circular jig or support in the manner discussed above, the assembly is heated to the temperature range in which bonding is effected in a first step to obtain glass-to-glass sealing of the parts. In a first embodiment this sealing or fusing step is effected at a temperature range substantially above a subsequent nucleation step temperature range. In such embodiment, the assembly, after being heated to about the annealing point temperature, is rapidly heated to above the nucleation temperature of the glass and to the temperature at which the viscosity of the adjoining, contacting polyhedron surfaces is such that fusion takes place and the polyhedrons become fused to form the unitary mirror blank. During the rapid heating, any nuclei which may have formed in the glass are dissolved. By rapidly heating the glass to the fusion temperature, the formation of large nuclei, which are difficult to dissolve, is avoided.

As stated, prior to bonding the polyhedrons and other members, the parts are assembled and arranged as desired and then preheated at a normal rate to about the annealing temperature, and then rapidly heated to the temperature where the fusion or bonding is effected. In a first embodiment, this step is effected at a temperature well above the temperature range at which a subsequent nucleation heat treatment step is effected.

The three major steps involved in the thermal processing steps are fusion, nucleation and crystallization. Although it is possible to carry out the entire process isothermally, the various steps are usually effected, as in this first embodiment, at different temperature plateaus or ranges. Conveniently, glass temperatures may be expressed in terms of the viscosity of the glass at that temperature, inasmuch as a large number of different glass compositions could necessitate identification of an equally large number of temperatures and would be impractical for present purposes. Therefore, it is most convenient to define the temperature for a specific glass in terms of the desired viscosity for working at that point. In this embodiment the temperature range in which this high-temperature fusion step is effected is generally in the range of the temperatures where the viscosity of the glass in poises is from about $10^9$ to about $10^5$, more usually in the range of about $10^{7.5}$ to $10^{6.5}$. In heating up to the fusion temperature step range, after reaching about the annealing point temperature, the rate of heating is preferably rapid, that is, at a rate of more than 10° C. per minute, in order to redissolve very small, incipient nuclei and to prevent the formation and growth of nuclei. Once the glass has been heated above the annealing point range, the glass can be very quickly heated because the strains have been relieved. When the fusion temperature range to be employed for the fusion step has been attained, the assembly is allowed to remain at such temperature range until fusion has been effected. The bonding of the parts takes place by fusing and some slumping, without premature surface crystallization preventing bonding.

After fusion, the bonded assembly is subjected to the thermal in situ nucleation and crystallization heat treatment schedule to bring about the proper amount of nucleation and subsequent crystallization to produce a low expansion telescope mirror blank, preferably transparent, which contains as the predominant crystalline species lithium-containing crystalline phases, either as beta-eucryptite or beta-eucryptite-like crystals or as beta-spodumene or beta-spodumene-like crystals, or both, as indicated by X-ray diffraction data. A multitude of such crystalline species, in random orientation and dispersed in a glassy matrix remaining as a result of in situ crystallization, are to be found in the glass-ceramic mirror blanks of the present invention. For a transparent mirror substantially all of the crystals of the thermally crystallized glass are of a diameter of less than about one-third micron measured across the largest lineal dimension of the crystals.

Figure 11:
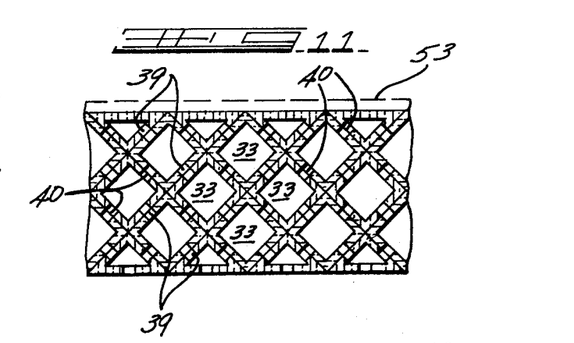
FIG. 11 is a sectional view of a portion of still another embodiment of a telescope mirror blank of the invention formed by a plurality of polyhedrons, including the hexahedron of FIG. 10, which define a plurality of passageways communicating from the cavities to the outside of the mirror blank. The sectional view is taken along a plane which includes the locus of the axes of each cylindrical hole in the hexahedron, which plane is parallel to a face of each hexahedron in the mirror blank structure.

In this embodiment, upon completion of fusion of adjacent surfaces, the mirror blank assembly is cooled to the nucleation temperature range which, of course, will vary with the particular glass composition. However, when expressed in terms of glass viscosity, it is usually in a range from $10^{10}$ to $10^{14}$ poises, generally about $10^{11.5}$ poises. After nucleation is completed, the temperature of the thermally crystallizable glass is increased to within a range where more rapid crystallization occurs, but usually not above about the $10^8$ poise temperature of the original glass. On the other hand, crystallization can be effected at the nucleation temperature in the range given by taking a longer time, especially at glass viscosities above $10^{14}$ poises. The length of time that is necessary for fusion, nucleation and crystallization to take place will vary with composition, and with the size of the article, such as a telescope mirror blank, which is being produced. While from 2 to 100 hours may be adequate for a small mirror blank, 1,000, 3,000 or even more hours will be necessary for a telescope mirror blank several hundred inches in diameter and having a thickness of about one-sixth of the diameter. This is necessary because glass is a very poor conductor of heat and it takes time to heat the interior of the mirror blank. For this reason, where mirror blanks are formed of hollow polyhedrons, the cavities of which are connected with a plurality of channels, and as shown in FIGS. 9 and 11, the temperature within the mirror blank may be regulated by passing fluid through the channels and into the cavities. The temperature of the fluid, of course, would be controlled so that the temperature within the center of the mirror blank would be substantially the same as that at the outer surfaces. A method for so treating hollow members of thermally crystallizable material is disclosed in the Keefer application referred to above, and such a method is also incorporated herein by reference.

While much lower overall heat treatment times are usually involved when operating isothermally, it is possible to carry out the entire process of sealing, nucleation and crystallization essentially isothermally. The required time is necessarily longer, as it is necessary to use a much lower temperature than that of glass at $10^8$ poises viscosity because the rate of nucleation at such high temperatures is very low or substantially zero. In this "isothermal" method, a useful temperature is that corresponding to a viscosity of about $10^{11.5}$, or in the range of temperatures corresponding to a viscosity of about $10^{10}$ down to about $10^{14}$ poises. In any event, the temperature must be such that it is possible to effect sealing and also nucleation of the glass at the one temperature. After the bonding has been effected, with concomitant nucleation, heating can be continued at the same temperature for as long as necessary to crystallize the glass until it has a desired expansion near zero. On the other hand, it is also possible and often desirable gradually to raise the temperature after sealing and nucleation have been effected so that the crystallization is effected during the slow raising of the temperature and/or during a holding at a higher temperature plateau.

One reason that effecting nucleation and bonding at the relatively low temperatures described in the preceding paragraph is not usually preferred is that there is little or essentially no slumping of the parts into intimate contact at such viscosities. Obviously, only the contacting areas are bonded; in order to have large areas of mutual contact between the parts, a very flat (for plane surfaces) matching surface must be prepared, usually by careful grinding to nearly absolute flatness. Such a procedure is obviously time-consuming and costly.

If the crystallization is effected at substantially the same low temperature as the sealing and nucleation, crystallization times can be very long, and times of 500 to 2,000 hours and longer are sometimes necessary.

While telescope mirror blanks of the present invention can be formed from polyhedrons of various vitreous compositions which have been used heretofore, such as fused silica, borosilicate glass and the like, it is preferred to utilize thermally crystallizable glasses, and particularly those of the lithium aluminosilicate system capable of being thermally in situ crystallized to form glass-ceramics, preferably transparent, having a lineal coefficient of thermal expansion which is relatively low and can be about zero.

While glass-ceramic telescope mirror blanks made in accordance with the invention are preferably transparent, they can also be opaque. However, it is considerably less difficult to mount a transparent telescope mirror upon its mountings and insure its being in a strain-free condition than it is to mount an opaque mirror. The reason, of course, is the ability to inspect the interior of the transparent mirror during the mounting process.

Low expansion glass-ceramic telescope mirror blanks can be formed by thermal in situ crystallization of the preferred thermally crystallizable base glass compositions. Compositions disclosed in Ser. No. 386,693, filed July 31, 1964 now abandoned, and its continuation-in-part Ser. No. 464,147, filed June 15, 1965 now abandoned, both assigned to the assignee of the present application, are useful in the performance of the invention. Broadly, these are thermally crystallizable glasses having a composition consisting essentially of the following components, present in the glass in the following weight percentages:

TABLE A

| Components | Weight Percent |
|---|---|
| $SiO_2$ | 56–70 |
| $Al_2O_3$ | 18–27 |
| $Li_2O$ | 3.4–4.5 |
| CaO | 0–3 |
| ZnO | 0–2 |
| $B_2O_3$ | 0–4 |
| $TiO_2$ | 0–6 |
| $ZrO_2$ | 0–3 |
| MgO | 0–3 |
| $Na_2O$ | 0–1 |
| $P_2O_5$ | 0–3 |
| $(SiO_2 + Al_2O_3)$ | at least 82 |
| $(SiO_2+Al_2O_3+B_2O_3+P_2O_5)$ | 86–91 |
| $(CaO+MgO+ZnO+Na_2O)$ | 2.5–6 |
| $(SiO_2+Al_2O_3+P_2O_5+Li_2O)$ | no more than 93 |
| $TiO_2 + ZrO_2$ | 2–6 | wherein the ratio of $(CaO + MgO + ZnO + Na_2O + B_2O_3)$ to $Li_2O$ is less than 2.4 and the ratio of $SiO_2$ to $Al_2O_3$ is no more than 3.8.

Specific compositions of thermally crystallizable glasses useful in the performance of the present invention and coming within the above composition range are Examples 36, 37, 39–49 inclusive and Examples H through M, described in Tables VIII and VIIIA of the aforesaid application Ser. No. 464,147, which Examples are incorporated herein by reference.

In the embodiment where sealing is effected at a temperature higher than the nucleation step, and where the parts to be sealed are massive, care must be taken in choosing compositions from among the species or composition range set forth in the application mentioned. Thus, if the mirror as in FIG. 2 or FIG. 9 is, say, 1 foot or more thick, for example, the compositions should have a relatively low rate of nucleation or "nuclei" formation, as well as a low rate of bulk crystal growth.

The reasons for the necessity of low rates of nucleation and bulk crystal growth in this embodiment are several. First, when the glass parts are cooled prior to assembly, even quickly, nuclei will form and even grow to a size which will not redissolve in the rapid heating step to the fusion temperature, if the rate of nuclei formation is too high. Then more nuclei could form when passing through the range of temperatures for high rates of nuclei formation (corresponding to about $10^{12}$ to $10^{11}$ poises for instance). If this happens, crystals can form too quickly to allow time for glass to glass fusion, since this fusion is effected at temperatures where crystal growth rates are near their maximum for a given glass.

Also, the crystal growth rate must be relatively low even if the nuclei formation rate of the bulk glass is low because, as is well known, glass crystallizes more easily on the surface than elsewhere, because of energy considerations at the surface or because of surface impurities from the ambient atmosphere, etc. Formation of surface crystals also impedes the making of a proper glass-to-glass seal.

Another problem is that, even after the seal is successfully effected at a temperature corresponding for instance to a temperature where the viscosity is about $10^8$ poises, the sealed and massive structure must be cooled down to the temperature range where the nuclei formation rate is significantly high and the crystal growth rate is quite low. Because of the large thickness of the parts in the structure, this cooling cannot be effected as rapidly as would be desired, and crystallization will take place (after a few nuclei form) while cooling from the sealing temperature down to the desired nucleation temperature step range, resulting in undesirably large crystals, opaque bodies or non-uniformly crystallized products. Thus, while cooling, the interior remains hotter longer than portions near the surface, and this can result in non-uniform coefficients of expansion through a cross section of a given structural member, because of non-uniform crystallization and premature crystallization in the interior hotter portions of the mirror, unless the glass is both slow to nucleate and slow in growing crystals.

In order to limit the rates of nucleation and crystal growth, especially for sealing relatively massive parts in this high temperature sealing embodiment, it is preferred to limit the compositions used within the broad range set forth hereinbefore to those compositions consisting essentially of the following:

TABLE B

| Component | Weight Percent |
|---|---|
| $SiO_2$ | 56–70 |
| $Al_2O_3$ | 18–27 |
| $Li_2O$ | 3.4–4.5 |
| CaO | 0–3 |
| ZnO | 0–<0.5 |
| $B_2O_3$ | 0–4 |
| $TiO_2$ | 0–2 |
| $ZrO_2$ | 0–3 |
| MgO | 0–3 |
| $Na_2O$ | 0–1 |
| $P_2O_5$ | 0–<1.5 |
| $(SiO_2+Al_2O_3)$ | at least 82 |
| $(SiO_2+Al_2O_3+B_2O_3+P_2O_5)$ | 86–91 |
| $(CaO+MgO+ZnO+Na_2O)$ | 2.5–6 |
| $(SiO_2+Al_2O_3+P_2O_5+Li_2O)$ | no more than 93 |
| $TiO_2 + ZrO_2$ | 2–3.5 | wherein the ratio of $(CaO + MgO + ZnO - Na_2O + B_2O_3)$ to $Li_2O$ is less than 2.4 and the ratio of $SiO_2$ to $Al_2O_3$ is no more than 3.8.

Even more preferably, in the compositions given above, the $TiO_2$ is 0–1.5 weight percent, and the total of $TiO_2$ plus $ZrO_2$ is 2–3 weight percent.

Other compositions suitable for the products and for carrying out the process of this invention are given in the specific examples.

The transparent crystallized glass-ceramic formed as mentioned above contains as the predominant crystalline species lithium containing crystalline phases selected from the group consisting of beta-eucryptite or beta-eucryptite-like crystals and beta-spodumene or beta-spodumene-like crystals or mixtures thereof, as indicated by X-ray diffraction data. The resulting ceramic product contains a multitude of such crystalline species which are distributed in random orientation throughout the crystallized glass ceramic and which are dispersed in a glassy matrix remaining as a result of the in situ crystallization. Substantially all of the crystals of this ceramic are of a diameter less than one-third micron measured across the largest lineal dimension of the crystals. The glass ceramic has an average lineal coefficient of thermal expansion in the range of about $-10 \times 10^{-7}$ to $+10 \times 10^{-7}$(0° to 300° C.) and preferably of about −3 to + 3 × 10⁻⁷, although glass ceramics of essentially zero expansion are readily produced.

The ultimate telescope mirror blanks and telescope mirror formed therefrom have a lineal coefficient of thermal expansion of the glass-ceramic in the range from +10 to −10 × 10⁻⁷/°C. over the range 0° to 300° C., and is preferably about zero over the range 0° to 300° C. or over the range the mirror will be subjected to during use. Furthermore, while the diameter of the crystals within the transparent ceramic is preferably less than about one-third micron measured along the largest lineal dimension of the crystals it is preferred that the crystals be of a diameter less than about one-fourth micron in size; the best results are evident when the diameter is less than about one-tenth micron in size.

The disclosures in the aforementioned application Ser. No. 467,147 relating to thermally crystallizable glass compositions set forth in Table A herein are incorporated herein by reference. As fully disclosed in the aforementioned pending application, the final coefficient of thermal expansion of the glass ceramic is determined by the composition of the thermally crystallizable glass and by the particular heat treatment to which it was subjected.

The importance of the transparency resides in the fact that it facilitates grinding and polishing of the reflecting surface prior to the application of the aluminum coating. However, the structure can also be made to be opaque by permitting the crystallization to continue to the point where the crystals are large enough to make the blank opaque. This can be accomplished by having the final crystallization temperature at above about 1,500° F. for a long period of time or above about 1,600° F. for a shorter time. The time-temperature factors depend upon the composition and its viscosity at such temperature. Some difficulties may on occasion be encountered by the presence of large crystals because of interference with the polishing and grinding of the reflecting surfaces. For example, if large crystals are removed, the surface cannot be ground to the necessary smoothness. Moreover, when an opaque structure is used, its coefficient of thermal expansion is generally much higher than that of the transparent glass ceramic of the same composition. Therefore, care must be taken not to impart to the opaque crystallized glass a high coefficient of thermal expansion and it is preferred to have a coefficient in the range +10 to −10 × 10⁻⁷ (0° to 300° C.).

A mirror blank having a concave surface can be made in accordance with the process of the present invention by the usual methods involving grinding, polishing and figuring to form the desired astronomical configuration and curvature, although a mirror having a concave surface can be made at the outset, as illustrated in FIG. 13 and discussed above. By making the reflecting surface concave at the outset, the amount of work necessary to grind, polish and figure the surface is considerably reduced. A thin coating of aluminum is then usually applied on the prepared surface in accordance with known methods, although any other suitable means to render the face surface reflectant can be employed.

The terms "beta-eucryptite crystals and beta-eucryptite-like crystals" have been used in an alternative sense. Thus, while beta-eucryptite is often thought of as a species crystal having one mole of lithia, one mole of alumina and 2 moles of silica, both terms are used in this application to designate crystalline species having the beta-eucryptite structure as shown by X-ray diffraction but the peaks can be shifted slightly depending on whether there is a definite amount of silica present other than exactly two moles, either more or less silica than two moles. Similarly, the terms "beta-spodumene crystals and beta-spodumene-like crystals" are used alternatively and in a generic sense, specifying crystalline species that have the crystalline structure of beta-spodumene that contains 4 moles of silica to one of alumina and one of lithia but with the peaks shifted somewhat when the crystalline structure contains more or less than 4 moles of silica. In the claims, therefore, the terms "beta eucryptite and beta-spodumene" are each used in this generic sense.

The following examples will serve to illustrate the present invention and are not considered limiting thereof in any way.

EXAMPLE I

A thermally crystallizable glass composition containing the following ingredients based on the total weight of the composition is suitable for preparation of the lightweight mirror blank of the present invention:

| Component | Weight Percent Range |
|---|---|
| $SiO_2$ | 68.4 |
| $Al_2O_3$ | 22 |
| CaO | 2 |
| $Li_2O$ | 3.9 |
| $TiO_2$ | 1 |
| $ZrO_2$ | 1.5 |
| $Na_2O$ | 0.7 |
| $K_2O$ | 0.2 |
| $Sb_2O_3$ | 0.3 |

The glass is molded to form solid polyhedrons of shapes illustrated in FIGS. 3 and 4. The solid polyhedrons are then arranged in a suitable circular jig in the manner illustrated in FIG. 5. The polyhedrons which are to be located at the outer periphery and sides of the mirror blank are readily cut to the desired size until a unitary mirror blank having a 16-inch diameter is formed within the jib. The assembly is then heated to above the annealing point of the glass and then heated rapidly, at the rate of more than 10° C. per minute to 1,750° F. where the viscosity is about 10⁸ poises. The assembly is maintained at this temperature for 2 hours. Thereafter the structure is subjected to a heat treatment at 1,350° F. for 260 hours and 1,600° F. for 1 hour. A satisfactory, transparent, crystallized mirror blank of nearly zero coefficient of expansion (0° to 300° C.) is obtained.

EXAMPLE II

The following thermally crystallizable glass composition is used to make a lightweight mirror blank. All components are indicated in weight percent based on the total composition.

| Component | Weight Percent Range |
|---|---|
| $SiO_2$ | 68.1 |
| $Al_2O_3$ | 20.9 |
| CaO | 3.5 |
| $Li_2O$ | 3.8 |
| $TiO_2$ | 1.8 |
| $ZrO_2$ | 1.5 |
| $Na_2O$ | <0.1 |
| $Sb_2O_3$ | 0.3 |

In this example, the polyhedrons are formed in suitable molds and air quenched to minimize nuclei formation. Thereafter, the component parts are arranged and assembled to form the mirror blank and are subjected to an isothermal heat treatment at 1,425° F. (viscosity of the glass at 1,435° F. is about $10^{11.5}$ poises) for a period of 1,000 hours whereby sealing, nucleation and crystallization occur at the same temperature, producing a transparent, crystallized mirror blank having an average coefficient of thermal expansion (0° to 300° C.) of −0.3 × 10⁻⁷/° C.

EXAMPLE III

The following glass is used to make a small mirror blank. The components are indicated in weight percent of the total composition:

| Component | Weight Percent Range |
|---|---|
| $SiO_2$ | 69.3 |

| | |
|---|---|
| $Al_2O_3$ | 20.2 |
| CaO | 2.9 |
| $Li_2O$ | 3.8 |
| $ZrO_2$ | 2.6 |
| $P_2O_5$ | 1.2 |

A small mirror blank of the construction shown in FIGS. 1, 2, 2a and 5 is made. Before assembly, the polyhedrons are ground, polished and cleaned and the assembled parts are given the following heat treatment:

The assembly is heated for one hour to 1,100° F., then slowly heated to the annealing point of about 1,350° F. Heating is thereafter continued at a rapid rate to 1,800° F. where it is held for 2 hours. The structure is then rapidly cooled to 1,350° F., where it is held for 264 hours, and then heated to 1,575° F. where it is held for 144 hours. The transparent, crystallized mirror blank structure has a positive coefficient of thermal expansion (0° to 300° C.) of less than $10 \times 10^{-7}/°C$.

EXAMPLE IV

Example III is repeated but the heat treatment of 264 hours followed by 1,575° F. for 144 hours is changed to 1,350° F. for 480 hours, followed by 1,575° F. for 24 hours. The transparent, crystallized mirror blank structure has a coefficient of thermal expansion of $0.5 \times 10^{-7}/°C$.

From the foregoing description of the invention it will be understood how glass articles, or crystallized glass articles, including telescope mirror blanks, can readily be formed by uniting a plurality of polyhedrons while taking advantage of the pressure applied to each surface of the polyhedrons by the force of gravity. The significance of applicants' invention will be better appreciated, for example, when one wishes to form a reflecting telescope mirror of a diameter of several hundred inches, which mirror must be transported hundreds or thousands of miles to the site for the astronomical telescope. By utilizing applicants' made and shipped to the site where the mirror is to be installed. All that will then be necessary is to provide a furnace large enough for treatment of the assembled mirror in accordance with a process described supra.

Another process which can be used, after a plurality of solid polyhedrons have been shipped to the site of the telescope, is to assemble the polyhedrons in the shape of a telescope mirror blank. The entire assembly is then heated until the polyhedrons are molten and the molten mirror blank is then subjected to a slow cooling cycle when using glasses such as borosilicate glasses until the entire blank is eventually at an atmospheric temperature. For this purpose, it is of no consequence if any of the contacting surfaces are in a plane perpendicular to the horizontally disposed mirrors. By forming the blank in this manner, the many problems inherent when pouring a molten glass into a large mold, for example, 100 or 200 inches in diameter, are obviated. Such problems include uneven cooling of the glass as it is poured, strains being formed in certain areas of the glass, etc. Further, it is possible to assemble the parts in the mold so that very few voids are present initially, minimizing finishing problems.

The solid polyhedrons useful for this last-mentioned process can be of glass, such as borosilicate glass or other low-expansion glasses, or can be of thermally crystallizable glass, including those described supra. When using thermally crystallizable glass, the molten glass is cooled and thereafter nucleated and crystallized according to one of the processes described hereinbefore.

It will be apparent from the foregoing that many advantages are inherent in the present invention. Included are low thermal expansion characteristics, excellent transparency, high strength and the like. Although the drawing shows several embodiments of the present invention, it is to be noted that other embodiments can also be made according to the teachings of the present invention. Besides telescope mirror blanks, glass articles or crystallized glass articles made in accordance with the disclosed invention will find uses as curtain walls, fire doors, tank linings, where strength is a prime requisite, flooring blocks, containers, storage bins, and the like.

While the invention has been described in terms of polyhedrons, this term, as used above and in the following claims, is not to be construed as limited to bodies whose surfaces are all plane surfaces but includes bodies having one or more or all surfaces which are nonplanar, i.e., rounded, or arcuate, for example. The essential factor is that the contacting surfaces of any two adjoining bodies are always complementary and parallel to each other, and, when the article is in a horizontal position, gravity pressure is applied to the surfaces along the area of contact due to the weight of the parts being sealed.

Thus the invention applies to making an article or mirror blank, from parts or members having surfaces that are parallel and complementary, in the mathematical or geometrical sense, to other parts in the structure, wherein surfaces of the parts or members are contacting, and are sealed to, complementary surfaces of other parts or members to make the entire structure. The only requirement is that the contacting surfaces to be sealed are aided by gravity, due to the weight of the parts during sealing when the article is in the horizontal position.

The invention has been described in terms of a telescope mirror blank, as illustrated in FIGS. 1, 2, 2a, 9, 11 and 13, wherein the upper surface can comprise the unfinished mirror surface and can be processed by grinding, polishing and figuring prior to the application of a reflective coating thereto. For purposes of claiming, however, such structures are defined as "telescope mirror blank cores", whether or not they also contain a separate layer or plate (such as 53 in FIG. 11) sealed thereto as the blank or unfinished mirror surface.

What is claimed is:

1. A unitary, rigid telescope mirror blank core comprising an assembly of a plurality of thermally crystallized glass polyhedrons having adjacent facing complementary and parallel contacting surfaces which contacting surfaces are directly sealed to each other, said polyhedrons arranged to thereby form a top surface and a bottom surface of said mirror blank core, none of the contacting surfaces of said polyhedrons are perpendicular to the horizontal when said mirror blank core is in a substantially horizontal position, the structure of said core being such that a plane passing horizontally through said core between said top and bottom surface layers would cut a plurality of said sealed polyhedron surfaces, wherein at least a substantial portion of said polyhedrons are regular cubes.

2. A unitary, lightweight rigid telescope mirror blank core comprising an assembly of a plurality of thermally crystallized glass polyhedrons having adjacent facing complementary and parallel contacting surfaces which contacting surfaces are directly sealed to each other, said polyhedrons arranged to thereby form a top surface and a bottom surface of said mirror blank core, none of the contacting surfaces of said polyhedrons are perpendicular to the horizontal when said mirror blank core is in a substantially horizontal position, the structure of said core being such that a plane passing horizontally through said core between said top and bottom surface layers would cut a plurality of said sealed polyhedron surfaces and wherein substantially all of said polyhedrons have cavities therein.

3. A unitary, rigid telescope mirror blank core comprising an assembly of a plurality of glass or thermally crystallized glass polyhedrons having adjacent facing complementary and parallel contacting surfaces which contacting surfaces are directly sealed together, said polyhedrons arranged to thereby form a top surface and a bottom surface of said mirror blank core, none of the contacting surfaces of said polyhedrons are perpendicular to the horizontal and when said mirror blank core is in a substantially horizontal position, the structure of said core being such that a plane passing horizontally through said core between said top and bottom surface layers would cut a plurality of said sealed polyhedron surfaces, wherein said polyhedrons include a. cubes of uniform size and
   b. portions of said cubes, each of said portions consisting of
   c. a tetrahedron having three of its edges equal in length to one edge of said cube and the remaining three edges equal in length to the distance between two diagonally disposed corners of one surface of said cube, and d. an irregular polyhedron which is of the shape such that when combined with said tetrahedron has the configuration of one of said cubes, each of said tetrahedrons and of said regular polyhedrons having one triangularly shaped surface, the edges of which are equal in length, said mirror blank having oppositely disposed surfaces, each of said surfaces consisting essentially of a plurality of said triangularly shaped surfaces.

4. A method of forming a mirror blank core comprising crystallized glass polyhedrons which comprises the steps of assembling a plurality of thermally crystallizable glass polyhedrons together so that the outermost surfaces of portions of said polyhedrons define a top surface and a bottom surface of said mirror blank core therebetween; and between said top and bottom surfaces adjacent polyhedrons having facing complementary and parallel surfaces in direct mutual physical contact at surfaces to be sealed, none of which contacting surfaces are perpendicular to the horizontal when said mirror blank core is in a substantially horizontal position; so that the force of gravity due to the weight of the polyhedrons aids in the formation of the seal in the sealing step; raising the temperature of the assembly while in a substantially horizontal position, to a sufficiently high temperature range whereby sealing of said glass polyhedrons is effected, and thereafter thermally crystallizing said mirror blank core by further heating.

5. A method of forming a telescope mirror blank core having a top surface and a bottom surface comprising
assembling a plurality of solid thermally crystallizable glass polyhedrons together so that outermost surfaces of portions of said polyhedrons define a top surface and a bottom surface of said core therebetween, and
between said top and bottom surfaces adjacent polyhedrons are in mutual physical contact,
raising the temperature of the assembly while in a substantially horizontal position to a sufficiently high temperature to melt all of the polyhedrons and which is at a temperature where substantially no nucleation of the glass takes place, maintaining the assembly at said temperature until all the glass polyhedrons are molten,
cooling the glass to a temperature to effect nucleation in a nucleation step by holding the assembly at a temperature range lower than the molten temperature range and
thereafter thermally crystallizing said mirror blank core by further heating.

6. A method of forming a rigid telescope mirror blank core having a top surface and a bottom surface and having between said surfaces a plurality of thermally crystallized glass polyhedrons comprising
a. assembling a plurality of thermally crystallizable glass polyhedrons together so that the outermost surfaces of portions of said polyhedrons define a top surface and a bottom surface of said core therebetween, and,
between said top and bottom surfaces adjacent polyhedrons are in mutual physical contact at surfaces to be sealed so that said surfaces to be sealed are not perpendicular to the horizontal position, so that the force of gravity due to the weight of the polyhedrons aids in the formation of the seal in the sealing step recited hereinafter,
b. raising the temperature of the assembly while in a substantially horizontal position to a sufficiently high temperature range corresponding to a glass viscosity of $10^9$ to $10^5$ poises wherein substantially no nucleation of said glass will take place, and where fusion sealing can be effected,
c. holding said assembly at said temperature range until said adjacent, contacting surfaces are fusion sealed together,
d. effecting nucleation in a nucleation step by holding said assembly in a temperature range corresponding to a viscosity of the original glass of $10^{10}$ to $10^{14}$ poises which is substantially lower than the temperature range of said fusion sealing step (c) and,
e. thereafter thermally crystallizing said assembly by further heating, the original arrangement of said polyhedrons in said assembly being such that the structure of said resulting crystallized core is such that a plane passing horizontally through said core between said top and bottom surfaces would cut a plurality of said sealed surfaces.

7. A method of claim 6 wherein steps (d) and (e) are effected at substantially the same temperature.

8. The method of claim 6 wherein step (d) is effected in a temperature range corresponding to a viscosity of the original glass of $10^{10}$ to $10^{12}$ poises.

9. The method as defined in claim 6 wherein the temperature to which said assembly is heated and maintained to fuse the adjoining, contacting surfaces in step (b) is that corresponding to a glass viscosity of from about $10^{7.5}$ to about $10^{8.5}$ poises.

10. The method as set forth in claim 6 wherein at least a portion of the polyhedrons are hollow.

11. A method of forming a rigid telescope mirror blank core having a top surface and a bottom surface and having between said surfaces a plurality of thermally crystallized glass polyhedrons, comprising
a. assembling a plurality of thermally crystallizable glass polyhedrons together so that the outermost surfaces of portions of said polyhedrons define a top surface and a bottom surface of said core therebetween, and
between said top and bottom surfaces adjacent polyhedrons are in mutual physical contact at surfaces to be sealed so that said surfaces to be sealed are not perpendicular to the horizontal when said mirror blank core is in a substantially horizontal position, so that the force of gravity due to the weight of the polyhedrons aids in the formation of the seal in the sealing step recited hereinafter,
b. heating the assembly while in a substantially horizontal position at a temperature in the range where nucleation and sealing of each of the said contacting surfaces is effected concomitantly and in the temperature range where the glass has a viscosity of $10^{10}$ to $10^{14}$ poises, until glass-to-glass sealing and nucleation of the glass parts has been effected,
c. thereafter thermally crystallizing said assembly by further heating, the original arrangement of said polyhedrons in said assembly being such that the structure of said resulting crystallized core is such that a plane passing horizontally through said core between said top and bottom surfaces would cut a plurality of said sealed surfaces.

12. A method of claim 11 wherein step (c) is effected at essentially the same temperature range as is step (b).

13. A method of claim 11 wherein step (c) is effected at a higher temperature range than is step (b).

14. A method of forming a unitary and rigid telescope mirror blank core having a top surface and a bottom surface comprising
assembling a plurality of solid thermally crystallizable glass polyhedrons together so that the outermost surfaces of portions of said polyhedrons define a top surface and a bottom surface of said mirror blank core therebetween and
between said top and bottom surfaces adjacent polyhedrons are in mutual physical contact at surfaces,
raising the temperature of the assembly while in a substantially horizontal position to a sufficiently high temperature range wherein substantially no nucleation of the glass will take place, holding said assembly at said temperature range until the polyhedrons are entirely melted and then subjecting the molten mirror blank to a slow cooling cycle until the entire blank is brought down to atmospheric temperature.

* * * * *